United States Patent Office
3,244,504
Patented Apr. 5, 1966

3,244,504
METHOD FOR COMBATING WEEDS
Henry Martin, Basel, and Hans Aebi, Riehen, Switzerland, assignors to Ciba Limited, Basel, Switzerland, a Swiss company
No Drawing. Original application Nov. 20, 1961, Ser. No. 153,744. Divided and this application Mar. 20, 1963, Ser. No. 272,817
Claims priority, application Switzerland, Nov. 22, 1960, 13,073/60
The portion of the term of the patent subsequent to May 26, 1981, has been disclaimed
6 Claims. (Cl. 71—2.6)

This application is a division of application Serial Number 153,744, filed November 20, 1961, now abandoned.

N-phenyl-N':N'-dimethyl-ureas, which are substituted by chlorine atoms in the phenyl radical, have recently become important as substances having a total herbicidal action. These compounds, however, do not possess a selective action.

The present invention is based on the unexpected observation that new carbanilic acid amides of the general formula

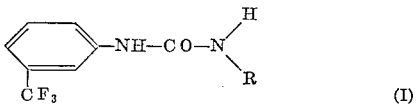

in which R represents an alkyl radical containing 1 to 3 carbon atoms, are very suitable for controlling weeds, and, when used in suitable concentration possess a surprisingly good selective action. The advantageous properties of the above carbanilic acid amides substituted in a meta-position by the trifluoromethyl group are especially surprising because carbanilic acid amides which are substituted in ortho-position by the trifluoromethyl group, and N-3:5-bis-trifluoromethylphenyl ureas, are not suitable for herbicidal use in practice.

The present invention therefore provides the carbanilic acid amides of the Formula I, and herbicidal preparations which comprise such a compound in admixture with a solvent, a non-solvent liquid diluent or a solid diluent.

The preparations may also contain a dispersing agent, an adhesive, a wetting agent, a fertilizer or another pest-controlling agent. The new compounds are suitable for use in relatively large amounts, for example, about 10 kg. or more of the active substances per hectare, as total herbicides, and in smaller amounts, for example, about 2 to 9 kg. of active substance per hectare, for the selective control of weeds among certain crops, for example, tobacco crops. Especially suitable are the following compounds:

N-3-trifluoromethylphenyl-N'-methyl-urea,
N-3-trifluoromethylphenyl-N'-ethyl-urea,
N-3-trifluoromethylphenyl-N'-n-propyl-urea, and
N-3-trifluoromethylphenyl-N'-isopropyl-urea.

The compounds of the general Formula I can be prepared by methods in themselves known. Generally speaking, all the usual methods for making urea derivatives, including the methods customarily used on a commercial scale, are suitable. An advantage method is, for example, to react a 3-trifluoromethylphenyl isocyanate with monomethylamine, monoethylamine, mono-n-propylamine of monoisopropylamine in an aqueous medium, or to react 3-trifluoromethyl-aniline in an organic solvent, for example, acetonitrile, with an appropriate alkyl isocyanate, for example ethyl isocyanate.

The new compounds are advantageously made up into herbicidal preparations in which the active substance are present in an emulsified, dispersed or dissolved form or incorporated with a dusting powder. The said compounds may be used alone or together with other herbicides such for example, as tri- or tetra-substituted aryl alkyl-ureas, halogenated phenoxy-alkane carboxylic acids, halogenated benzoic acids or phenylacetic acids, halogenated fatty acids or salts, esters or amides thereof, or together with halogenated benzonitriles, halogenated terephthalic acid esters or halogenated methacrylic acid anilides, borax or other inorganic salts, such as abraum salts, or with calcium cyanamide, urea and other fertilizers, or with pest control agents, such, for example, as chlorinated hydrocarbons or phosphoric acid esters. Active substances having a basic action, such as certain tertiary or quaternary amines having a herbicidal action, may also be incorporated in the preparations, such, for example, as dodecyl-hexamethylene imine or salts thereof, 1:1'-ethylene-2:2'-dipyridilium dibromide or salts thereof. Herbicidally active carbamates, thiol-carbamates or dithiocarbamic acid esters or derivatives of s-triazine may also be incorporated in the preparations. Certain heterocyclic compounds having a herbicidal action, such for example as 2-chlorobenzothiazole, 3-amino-1:2:4-triazole, maleic acid hydrazide or 3:5-dimethyl-tetrahydro-1:3:5-thiadiazine-2-thione, or simpler herbicidal substances, such as pentachlorophenol, dinitrocresol, dinitrobutyl-phenol, naphthylphthalamic acid or methyl-isothiocyanate, may also be used.

Spraying liquors containing the active substances can be prepared for example, with mineral oil fractions of high to medium boiling range, such as Diesel oil or kerosene, or with coal tar oils or oils of vegetable or animal origin, or with hydrocarbons, such as alkylated naphthalenes, tetrahydro-naphthalene, if desired, with the use of xylene mixtures, cyclohexanole or ketones, or chlorinated hydrocarbons, such as tetrachlorethane, trichlorethylene or tri- or tetrachlorobenzenes.

The preparations may also be made up as emulsion concentrates, pastes or wettable powders which are brought into an aqueous form ready for use by dilution with water.

As emulsifying or dispersing agents there may be mentioned quaternary ammonium compounds, soaps, soft soaps, aliphatic sulfuric acid ester salts, aliphatic-aromatic sulfonic acid salts, alkoxyacetic acids, polyglycol ethers of fatty alcohols and polyethylene oxide condensation products.

To prepare strewing or dusting preparation, talcum, kaolin, bentonite, calcium carbonate, calcium phosphate, charcoal, cork powder, wood flour or other materials of vegetable origin may be used. The herbicidal preparations may also contain the usual additions which improve the distribution, adhesiveness, resistance to rain or penetrating power. As such substances there may be mentioned fatty acids, resins, glue, casein or, for example, alginates and the like.

The term "weeds" is used herein to include also undesirable cultivated plants, i.e., cultivated plants grown previously or in the vicinity.

The following examples illustrate the invention:

*Example 1*

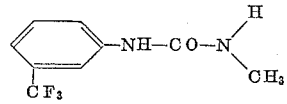

36 grams of 3-trifluoromethylphenyl isocyanate were dissolved in 20 cc. of acetonitrile, and the solution was run into 8 grams of monomethylamine dissolved in 200 cc. of water. The carbanilic acid amide of the above formula precipitated out. The whole was stirred for a further 3 hours, and the precipitate was then filtered with suction, washed and dried in vacuo at 50° C. The yield of the crude product was 39.5 grams and it melted at 110–114° C.

When crystallized from dilute alchohol the N-3-trifluoromethylphenyl-N'-methyl-urea melted at 113–116° C.

$C_9H_9ON_2F_3$ calculated: C, 49.54%; H, 4.16%; N, 12.84%. Found: C, 49.50%; H, 4.00%; N, 13.05%.

Example 2

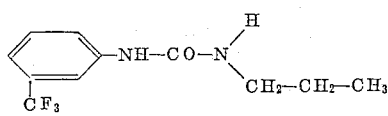

374 grams of 3-trifluoromethylphenyl isocyanate were dissolved in 300 cc. of acetone, and the solution was added, while stirring briskly, to 140 grams of n-propylamine in 2 liters of water. The temperature was kept at 40° C. by cooling with ice water. The product which was first obtained in a pasty form became solid on further stirring. The precipitate was filtered off with suction, washed and dried in vacuo. The yield of crude product was 475 grams and it melted at 88.5–93° C. When crystallized from dilute alcohol the N-3-trifluoromethylphenyl-N'-n-propyl urea melted at 95–96° C.

$C_{11}H_{13}ON_2F_3$ calculated: C, 53.66%; H, 5.32%; N, 11.38%. Found: C, 53.70%; H, 5.22%; N, 11.07%.

Example 3

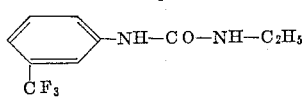

46 grams of 3-trifluoromethyl-aniline were dissolved in acetonitrile and 15 grams of ethyl isocyanate were added. After the condensation has taken place, the reaction mixture was concentrated, and the N-3-trifluoromethylphenyl-N'-ethyl-urea was recrystallized from dilute alcohol. It melted at 116–117° C.

$C_{10}H_{11}ON_2F_3$ calculated: C, 51.72%; H, 4.77%; N, 12.06%. Found: C, 51.91%; H, 4.58%; N, 12.27%.

Example 4

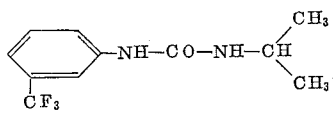

The above compound, namely N-3-trifluoromethylphenyl-N'-isopropyl-urea, was prepared by the method described in Example 2. After recrystallization from acetonitrile the product melted at 163–164° C.

$C_{11}H_{13}ON_2F_3$ calculated: C, 53.66%; H, 5.32%; N, 11.38%. Found: C, 53.93%; H, 5.25%; N, 11.25%.

Example 5

10 grams of N-3-trifluoromethylphenyl-N'-methyl-urea, prepared as described in Example 1, were mixed with 2 grams of sulfite cellulose waste liquor, and the mixture was made up to 100 ml. with water. The mixture is subjected to intensive grinding, whereby a finely divided stable dispersion was obtained.

Example 6

Flower pots were filled with earth in a greenhouse and seeds of the plants named hereunder were sown therein:

*Avena sativa, Setaria italica, Dactylis glomerata, Sinapis alba, Calendula chrysantha,* and *Lepidium sativum.*

The earth was watered and treated on the day of sowing with a spraying liquor prepared with the dispersion obtained as described in Example 5. The active substance was applied at the rate of 10 kg. per hectare. Four weeks after treatment, all the test plants were completely or almost completely dead.

Example 7

Flower pots were prepared in a manner similar to that described in Example 6. 14 days after sowing the plants were sprayed with a spraying liquor prepared from the dispersion obtained as described in Example 5, the active substance being applied at the rate of 10 kg. per hectare. As the active substance was also absorbed by the leaves, the plants treated were completely dead after 14 days.

Example 8

40 parts of the compound of Example 2, namely N-3-trifluoromethylphenyl-N'-n-propyl-urea were mixed with 58 parts of kaolin and 2 parts of the emulsifier "Toximul MP" (brand name) supplied by Ninol Inc., Chicago, which consists of a mixture of anion-active and non-ionic surface-active organic compounds, and the mixture was finely ground. The mixture can be used as a wettable powder.

Example 9

A field was planted with leeks and divided into parcels. Two weeks after the leeks had been planted, the field was sprayed with a spraying liquor prepared with the wettable powder of Example 8, the liquor being applied at the rate of 3 and 9 kg. of N-3-trifluoromethylphenyl-N'-n-propyl-urea per hectare. The result was inspected 6 weeks after the treatment. Whereas the control parcels were completely overgrown with weeds, the treated parcels remained practically weed-free. The leeks were not damaged at the higher rate of application of the herbicide (9 kg. per hectare). The following weeds were completely or almost completely destroyed:

*Stellaria media, Calinsoga parviflora, Amaranthus retroflexus, Capsella bursa pastoris, Atriplex patulum, Senecio vulgaris, Portulaca oleracea* and *Chenopodium album.*

Example 10

A tobacco field was sprayed 16 days after the tobacco had been planted with a spraying liquor prepared with the wettable powder of Example 8, the N-3-trifluoromethylphenyl-N'-n-propyl-urea being applied at the rates of 3 to 9 kg. per hectare. The result was inspected 5 weeks after the treatment. Both rates of application were well tolerated by the tobacco plants under the test conditions given. The following weeds can be controlled at the rate of 9 kg. of active substance per hectare:

*Panicum crus galli, Chenopodium album, Galinsoga parviflora, Polygonum persicaria, Stellaria media, Taraxacum officinale* and *Roripa palustro.*

Example 11

(a) 50 parts of N-3-trifluoromethylphenyl-N'-n-propyl-urea, 45 parts of talcum and 5 parts of a dispersing agent consisting of 3 parts of dodecyl sulfonate and 2 parts of a condensation product of dodecyl alcohol with about 8 mols of ethylene oxide were mixed together and finely ground. The resulting wettable powder can be mixed with any proportion of water.

The following tests were carried out with spraying liquors prepared with the above wettable powder. The concentration of active substance was 0.6 percent by weight when applied at the rate of 6 kg. of active substance per hectare, and 0.2 percent by weight, when applied at the rate of 2 kg. of active substance per hectare.

(b) A field was planted with *Allium porrum*, then divided into parcels, and some of the parcels were sprayed 12 days later with aqueous spraying liquors prepared with the wettable powder described under (a) at the rates of 2 and 6 kg. per hectare. 13 days after spraying, inspection showed that the untreated control parcels were completely overgrown with weeds, and in the case of the treated parcels the results were as follows:

| Weeds | Inhibiting action as a percentage | |
|---|---|---|
| | 2 kg. of active substance per hectare | 6 kg. of active substance per hectare |
| Galium aparine | 100 | 100 |
| Lamium purpureum | 30 (partially inhibited) | 100 |
| Polygonum persicaria | 100 | 100 |
| Fumaria officinalis | 60 (strongly inhibited) | 100 |
| Sinapis alba | 60 (strongly inhibited) | 100 |
| Mercurialis annua | 100 | 100 |
| Chenopodium album | 100 | 100 |
| Anagallis arvensis | 60 (strongly inhibited) | 100 |
| Sonchus asper | 100 | 100 |
| Polygonum convolvulus | 60 (strongly inhibited) | 100 |
| Viola tricolor | 60 (strongly inhibited) | 100 |
| Effect on the crop plant (*Allium porrum*) | No damage | No damage |

(c) A field was planted with *Apium graveolens*, then divided into parcels, and some of the parcels were sprayed 12 days later with an aqueous spraying liquor prepared with the wettable powder described under (a), at the rate of 6 kg. per hectare. 3 weeks later the untreated control parcels were completely overgrown with weeds, while the treated parcels remained practically free from weeds.

Especially the following weeds were controlled: *Stellaria media, Galinsoga parviflora, Urtica urens, Sonchus asper, Capsella bursa pastoris, Senecio vulgaris, Lamium purpureum*. The crop plant was not damaged.

What is claimed is:

1. The method for selectively combating weeds in crop cultures which comprises applying to the area where the weed combating effect is desired, in an amount sufficient to combat the weeds, a compound of the formula

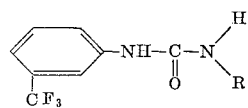

in which R represents an alkyl radical containing 1 to 3 carbon atoms.

2. A method as claimed in claim 1, wherein N-3-trifluoromethylphenyl-N'-methyl-urea, is applied to the area where the weed combating effect is desired.

3. A method as claimed in claim 1, wherein N-3-trifluoromethylphenyl-N'-ethyl-urea, is applied to the area where the weed combating effect is desired.

4. A method as claimed in claim 1, wherein N-3-trifluoromethyl-N'-n-propyl-urea, is applied to the area where the weed combating effect is desired.

5. A method as claimed in claim 1, wherein N-3-trifluoromethylphenyl-N'-isopropyl-urea, is applied to the area where the weed combating effect is desired.

6. The method for combating weeds in tobacco cultures without damaging the tobacco plants, which comprises applying to the area where the weed combating effect is desired, in an amount sufficient to combat the weeds, a compound of the formula set forth in claim 1.

References Cited by the Examiner

UNITED STATES PATENTS

| 2,655,447 | 10/1953 | Todd | 71—2.6 |
| 2,726,150 | 12/1955 | Wolter | 71—2.6 |
| 3,134,665 | 5/1964 | Martin et al. | 71—2.6 |

OTHER REFERENCES

Abel: Chemistry and Industry, August 17, 1957, pages 1106 to 1112.

LEWIS GOTTS, *Primary Examiner.*

JULIAN S. LEVITT, *Examiner.*

JAMES O. THOMAS, *Assistant Examiner.*